United States Patent Office 2,924,770
Patented Feb. 9, 1960

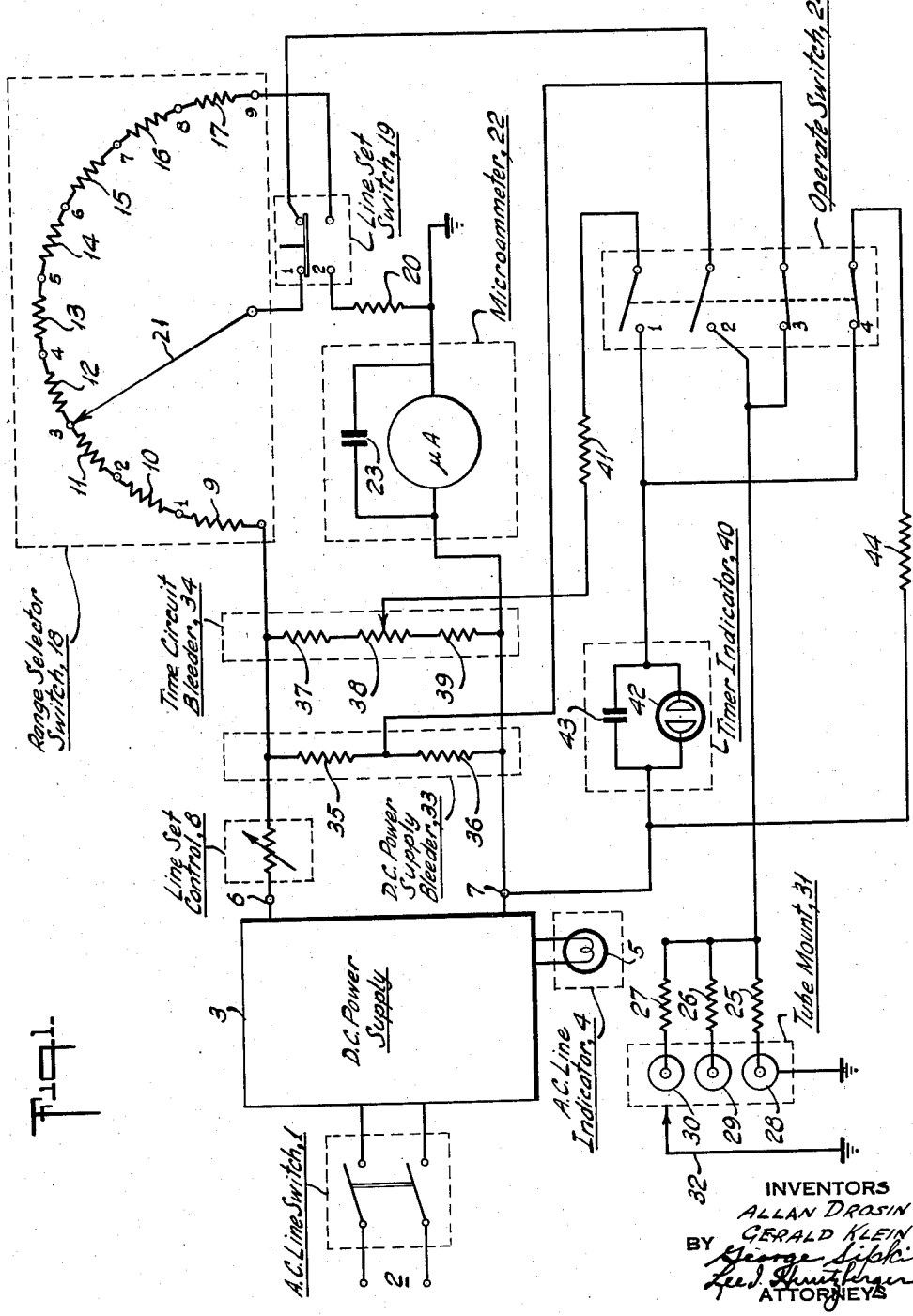

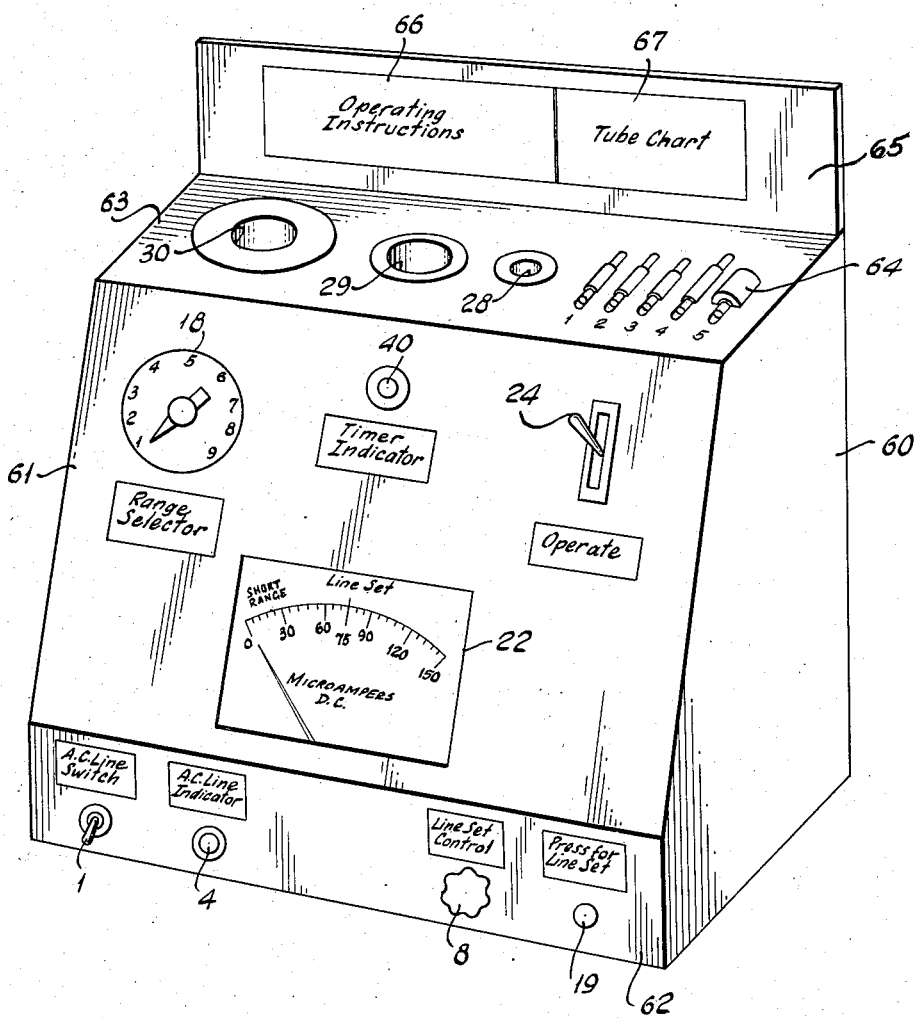

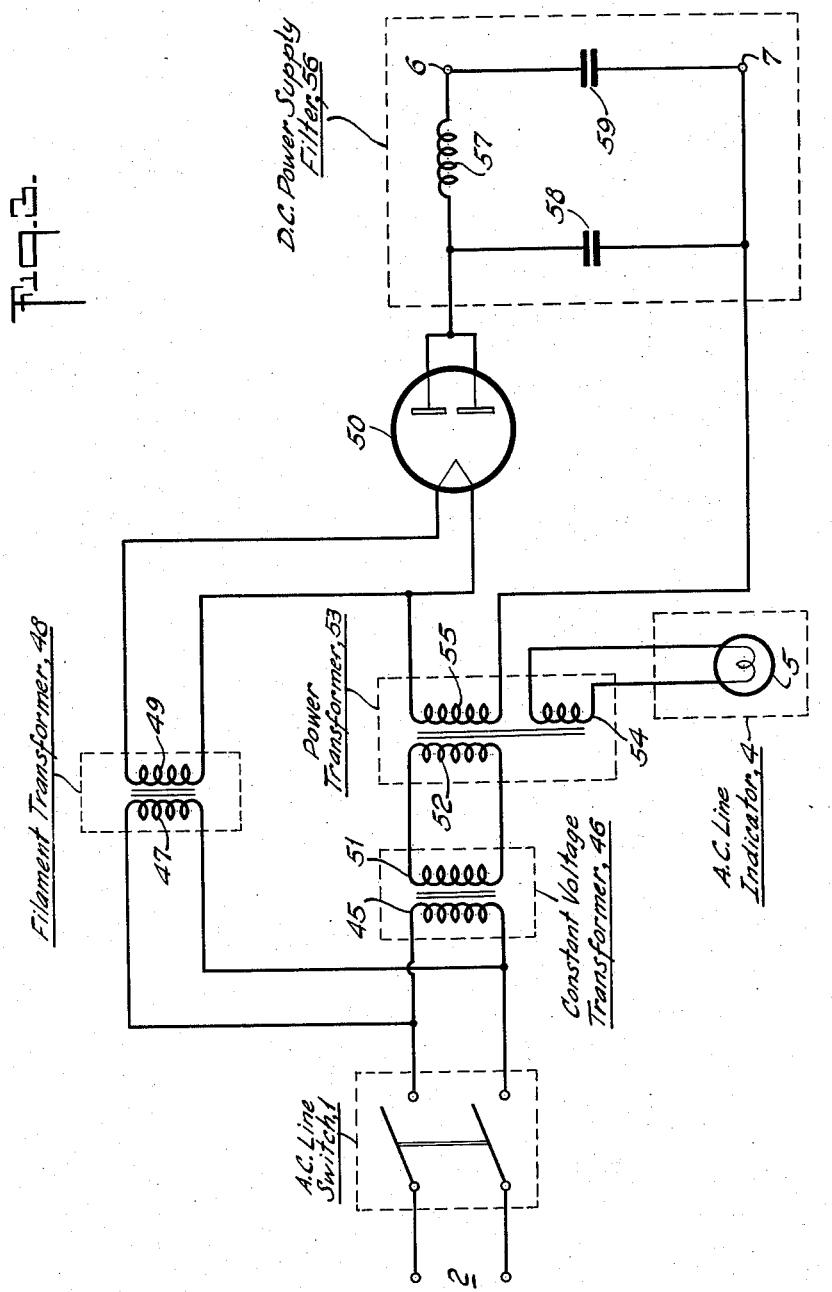

2,924,770

TR TUBE TESTING APPARATUS

Allan Drosin, Brooklyn, N.Y., and Gerald Klein, Wannamassa, N.J., assignors to the United States of America as represented by the Secretary of the Navy Application June 6, 1955, Serial No. 513,619

18 Claims. (Cl. 324—24)

(Granted under Title 35, U.S. Code (1952), sec. 266)

The invention described herein may be manufactured and used by or for the Government of the United States of America for governmental purposes without the payment of any royalties thereon or therefor.

This invention concerns TR tube testing apparatus.

TR tubes, as known in the art, are gas switching tubes designed for use at microwave frequencies. A major cause of failure of TR tubes is due to an absorption of the gas within the tube by the metal electrodes. This absorption of gas reduces the pressure gradually within the tube to the point where it becomes very difficult to break down the gap between the electrodes. Because this, as well as other causes of failure, are only gradually noticed, TR tubes should be checked carefully and periodically for efficient operation.

The principal object of this invention is the provision of testing apparatus for determining the ignition time characteristics and the ignition voltage characteristics of TR tubes.

An object of this invention is the provision of TR tube testing apparatus which directly indicates test determinations.

An object of this invention is the provision of TR tube testing apparatus which presents direct visual indications of test determinations.

An object of this invention is the provision of TR tube testing apparatus of simple construction and simple operation.

An object of this invention is the provision of TR tube testing apparatus of compact construction.

An object of this invention is the provision of TR tube testing apparatus of portable type.

An object of this invention is the provision of TR tube testing apparatus which is readily operated by unskilled personnel.

An object of this invention is the provision of TR tube testing apparatus requiring a minimum of interpretation of test determinations.

An object of this invention is the provision of TR tube testing apparatus suitable for testing all types of TR tubes.

A further object of this invention is the provision of TR tube testing apparatus of efficient and economical construction and operation.

Other objects and many of the attendant advantages of this invention will be readily appreciated as the same becomes better understood by reference to the following detailed description when considered in connection with the accompanying drawings wherein:

Fig. 1 is a circuit diagram of the TR tube testing apparatus of the present invention;

Fig. 2 is a schematic presentation of a preferred embodiment of cabinet for the TR tube testing apparatus of the present invention; and Fig. 3 is a circuit diagram of a preferred embodiment of D.C. power supply for the TR tube testing apparatus of the present invention.

The A.C. line switch 1 closes the circuit to the A.C. input source 2 to provide power to the D.C. power supply circuit 3. The D.C. power supply circuit 3 may be any suitable type of D.C. power supply circuit known in the art. A preferred embodiment of D.C. power supply circuit is shown in Fig. 3. The A.C. line switch 1 is a toggle type, double pole, single throw switch. The A.C. line indicator 4 is a pilot light 5 which derives its power from the secondary of the power transformer (not shown in Fig. 1) of the D.C. power supply circuit 3.

The output of the D.C. power supply circuit 3 is impressed upon the output terminals 6 and 7. The condenser 59, which is connected between the output terminals 6 and 7, is not shown in Fig. 1. The line from the output terminal 6 includes the line set control potentiometer 8, the ignitor series limiting resistors 9, 10, 11, 12, 13, 14, 15, 16 and 17 of the range selector switch 18 the number 2 terminals of the line set switch 19 and the voltmeter multiplier resistor 20. The line set control potentiometer 8 has a resistance of 10,000 ohms in a preferred embodiment of this invention.

The range selector switch 18 is a single wafer rotary selector type, one pole, nine position switch. In a preferred embodiment of this invention, position 1 of the range selector switch 18 places the ignitor series limiting resistor 9, of 2.25 megohms resistance, in circuit with the rotary selector 21 of said switch. Position 2 of the range selector switch 18 includes the ignitor series limiting resistor 10, of 0.75 megohm resistance, in circuit with the rotary selector 21 of said switch. Position 3 of the range selector switch 18 includes the ignitor series limiting resistor 11, of 0.25 megohm resistance, in circuit with the rotary selector 21 of said switch. Position 4 of the range selector switch 18 includes the ignitor series limiting resistor 12, of 0.25 megohm resistance, in circuit with the rotary selector 21 of said switch. Position 5 of the range selector switch 18 includes the ignitor series limiting resistor 13, of 0.25 megohm resistance, in circuit with the rotary selector 21 of said switch. Position 6 of the range selector switch 18 includes the ignitor series limiting resistor 14, of 0.25 megohm resistance, in circuit with the rotary selector 21 of said switch. Position 7 of the range selector switch 18 includes the ignitor series limiting resistor 15, of 0.25 megohm resistance, in circuit with the rotary selector 21 of said switch. Position 8 of the range selector switch 18 includes the ignitor series limiting resistor 16, of 0.25 megohm resistance, in circuit with the rotary selector 21 of said switch. Position 9 of the range selector switch 18 includes the ignitor series limiting resistor 17, of 0.5 megohm resistance, in circuit with the rotary selector 21 of said switch.

When the rotary selector 21 of the range selector switch 18 is in position 1, 2.25 megohms are in circuit with said rotary selector. When the rotary selector 21 of the range selector switch 18 is in position 2, 3.0 megohms are in circuit with said rotary selector. When the rotary selector 21 of the range selector switch 18 is in position 3, 3.25 megohms are in circuit with said rotary selector. When the rotary selector 21 of the range selector switch 18 is in position 4, 3.50 megohms are in circuit with said rotary selector. When the rotary selector 21 of the range selector switch 18 is in position 5, 3.75 megohms are in circuit with said rotary selector. When the rotary selector 21 of the range selector switch 18 is in position 6, 4.0 megohms are in circuit with said rotary selector. When the rotary selector 21 of the range selector switch 18 is in position 7, 4.25 megohms are in circuit with said rotary selector. When the rotary selector 21 of the range selector switch 18 is in position 8, 4.50 megohms are in circuit with said rotary selector. When the rotary selector 21 of the range selector switch 18 is in position 9, 5.0 megohms are in circuit with said rotary selector.

The line set switch 19 is a push button type, spring return, two circuit switch; its number 1 terminals are normally closed to keep the circuit of the rotary selector 21 of the range selector switch 18 closed and its number 2 terminals are normally open to keep the circuit between the ignitor series limiting resistors 9, 10, 11, 12, 13, 14, 15, 16 and 17 and the voltmeter multiplier resistor 20 open. The voltmeter multiplier resistor 20 has a resistance of 5.0 megohms, in a preferred embodiment of this invention.

A line from the output terminal 7 of the D.C. power supply circuit 3 includes the microammeter 22 and goes to ground; this line is joined by the voltmeter multiplier resistor 20 between said microammeter and ground. The microammeter 22 is a 100 microampere meter, shunted, while utilized in the apparatus, for 150 microamperes full scale; the condenser 23 is shunted across said microammeter to bypass alternating current which would otherwise go through said meter.

The line of the rotary selector 21 includes the ignitor series limiting resistors 25, 26 and 27 between the position of said rotary selector and the output terminal 7 of the D.C. power supply circuit 3 and the line set control potentiometer 8, as well as the number 1 terminals of the line set switch 19, the number 2 terminals of the operate switch 24, the ignitor series limiting resistors 25, 26 and 27 and the tube sockets 28, 29 and 30, and goes to ground at the tube socket 28. The tube sockets 28, 29 and 30 are included in the tube mount 31. The ignitor series limiting resistors 25, 26 and 27 each have a resistance of 0.5 megohm in a preferred embodiment of this invention; each of these resistors connects its associated tube socket to the line. The ground line 32 is clamped to the conducting surface of the tube under test, when said tube is inserted in socket 29 or 30, to close the circuit to ground; the socket 28 is grounded, so that said ground line is not utilized when said test tube is inserted in socket 28. A set of adaptors (not shown in Fig. 1) is utilized to facilitate the insertion of different types of tubes under test in the tube sockets.

The operate switch 24 is a lever type, spring return, four pole, double throw switch; its number 1 and number 2 terminals are normally open and its number 3 and number 4 terminals are normally closed.

The D.C. power supply bleeder 33 and the timer circuit bleeder 34 are shunted across the lines from the output terminals 6 and 7 of the D.C. power supply circuit 3; between the line set control potentiometer 8 and the range selector switch 18 on the terminal 6 line and between the terminal and the microammeter 22 on the terminal 7 line. The D.C. power supply bleeder 33 comprises the series connected resistors 35 and 36. In a preferred embodiment of the invention, the resistor 35 has a resistance of 75,000 ohms and the resistor 36 has a resistance of 2,000 ohms. The timer circuit bleeder 34 comprises the series connected resistors 37, 38 and 39; the resistor 38 is the timer set control potentiometer and is positioned between the resistors 37 and 39. In a preferred embodiment of this invention, the resistor 37 has a resistance of 5.0 megohms, the timer set control potentiometer 38 has a resistance of 2.0 megohms and the resistor 39 has a resistance of 4.0 megohms.

Another line from the output terminal 7 of the D.C. power supply circuit 3 includes the timer indicator 40, the number 1 terminals of the operate switch 24 and the timer circuit charging resistor 41 and terminates in a terminal of the timer set control potentiometer 38. The timer indicator 40 comprises a parallel connected neon lamp 42 and a timer circuit charging condenser 43; in a preferred embodiment of this invention said condenser has a capacitance of 2 microfarads. The timer circuit charging resistor 41 has a resistance of 3.0 megohms in a preferred embodiment of this invention.

The discharge resistor 44 for the timer circuit charging condenser 43 is shunted across the timer indicator 40, through the number 4 terminals of the operate switch 24. In a preferred embodiment of this invention the discharge resistor 44 has a resistance of 50,000 ohms.

A line is connected from a point between the D.C. power supply bleeder resistors 35 and 36, through the number 3 terminals of the operate switch 24, to the line between the number 1 terminals of the line set switch 19 and the tube mount 31, at a point between said tube mount and the number 2 terminals of said operate switch.

The operation of the TR tube testing apparatus of the present invention, as shown in Fig. 1, is as follows.

The principle of operation is that in a circuit loop having a known resistance, a microammeter and a TR tube in series connection across a known D.C. voltage, the microammeter indicates whether there is a short circuit in said tube and what the ignition voltage of said tube is. If the ignition voltage, as represented by said microammeter reading, is within a predetermined range, the tube under test is acceptable on that count. If the tube ignition time, as represented by the microammeter indication of an ignition voltage, is within a predetermined period of time after initial excitation of the test circuit, said tube is acceptable on that count.

D.C. power supply

The A.C. line switch 1 is thrown to its On position to close the A.C. input 2 to the D.C. power supply circuit 3 and permit the apparatus to warm up. The D.C. power supply circuit 3 activates the short circuit indicator circuit and the timer circuit, and fires the test tubes.

Line set

The line set switch 19 is depressed and the line set control potentiometer 8 is adjusted until the pointer of the microammeter 22 is at center scale (line set). The depression of the line set switch 19 closes the number 2 terminals of said switch to form a circuit across the D.C. power supply output terminals 6 and 7 which includes the line set control potentiometer 8, the ignitor series limiting resistors 9, 10, 11, 12, 13, 14, 15, 16 and 17, the voltmeter multiplier resistor 20, the microammeter 22 and the shunted D.C. power supply bleeder 33. The adjustment of the line set control potentiometer 8 for a center scale reading of 75 microamperes on the microammeter 22 sets the voltage across the D.C. power supply bleeder resistors 35 and 36 at 750 volts.

The bleeder network consists of the D.C. power supply bleeder 33 and the line set control potentiometer 8 and comprises the effective load on the D.C. power supply. The bleeder network prevents the removal or change of the load from causing more than a negligible variation in the output voltage.

Short circuit indicator

The tube cap, or ignitor electrode, of the test tube is inserted in a tube socket 28, 29 or 30, of the tube mount 31, predetermined in accordance with the type of TR tube tested and noted in the tube chart (shown in Fig. 2). If socket 29 is utilized for the tube under test a suitable adaptor (shown in Fig. 2) is first inserted in said socket and the tube is inserted in said adaptor. The ground line 32 is clamped to the conducting surface of the tube under test when the tube sockets 29 or 30 are utilized; this closes the circuit through the apparatus. The tube socket 28 is grounded, so that the ground line 32 need not be used when said socket is utilized.

When the tube under test is inserted in its suitable socket and is properly grounded, if there is a short circuit in the tube under test, the needle of the microammeter 22 deflects into the short circuit range of its scale. If there is no short circuit in the tube under test, the needle of the microammeter 22 does not deflect. When the tube under test is inserted in its socket, a circuit is formed from ground to the tube under test, including the grounded tube, the associated ignitor series limiting resistor of said tube, the number 3 terminals of the operate switch 24, the resistor 36 of the D.C. power supply bleeder 33, the microammeter 22, and going to ground near said microammeter. If the ignitor electrode of the tube under test is short circuited to ground, the microammeter 22 deflects upward to approximately 39 microamperes.

Timer

The operate switch 24 is pulled down to close its number 1 and 2 terminals and to open its number 3 and 4 terminals. The timer set control potentiometer 38 is adjusted until the neon lamp 42 of the timer indicator 40 flashes five seconds after the operate switch 24 is pulled down. The rotary selector 21 of the range selector switch 18 is moved to a position predetermined in accordance with the type of TR tube tested and noted in the tube chart (shown in Fig. 2).

When the operate switch 24 is pulled down, to close its number 1 and 2 terminals and to open its number 3 and 4 terminals, a circuit is completed for the measurement of the firing time characteristics of the test tube. The opening of the number 4 terminals of the operate switch 24 opens the discharge resistor 44 shunt line to unshort the timer circuit charging condenser 43. The closing of the number 1 and 2 terminals of the operate switch 24 closes a circuit to apply a voltage from the timer circuit bleeder 34, through the timer circuit charging resistor 41, across the timer circuit charging condenser 43 and the neon lamp 42. The voltage across the neon lamp 42 increases until the ignition voltage of said lamp is reached. The neon lamp 42 then ionizes and the timer circuit charging condenser 43 discharges until the extinguishing voltage of said lamp is reached. The neon lamp 42 then deionizes and the condenser 43 voltage again increases until the ignition voltage of said lamp is reached.

Since all charging cycles other than the first do not start with zero voltage on the timer circuit charging condenser 43, the intervals between successive flashes of the neon lamp 42 are shorter than the time between the pulling down of the operate switch 24 and the initial flash of said lamp. It is only this first flash that is utilized for timer purposes.

When the operate switch 24 is pulled down, if the firing time characteristic of the tube under test is undesirable, the timer indicator lamp 42 flashes before the needle of the microammeter 22 deflects upward. If the firing time characteristic of the tube under test is undesirable, the needle of the microammeter 22 may deflect upward before the neon lamp 42 flashes, but it does not come to rest at the current indication of the microammeter 22 predetermined in accordance with the type of TR tube tested and noted in the tube chart (shown in Fig. 2). If the firing time characteristic of the tube is desirable, the needle of the microammeter 22 deflects, before the neon lamp 42 flashes, and comes to rest at the predetermined current indication of the microammeter 22 for the tube under test.

The operate switch 24 is pulled up to close its number 3 and 4 terminals and to open its number 1 and 2 terminals. The closing of the number 4 terminals of the operate switch 24 discharges the timer circuit charging condenser 43 to zero, through the discharge resistor 44, in a fraction of a second. This resets the circuit to its initial conditions. The values of the circuit elements are so selected that the timer set control potentiometer 38 is readily adjusted to flash the neon lamp 42 of the timer indicator 40 exactly five seconds after the operate switch 24 is pulled down.

Range selector

The range selector switch 18 selects the value of limiting resistance to be placed in series with the ignitor electrode of the tube under test. Since, as is common in gas devices, the ignitor circuit of a TR tube has a fairly constant voltage drop over a wide range of current, the limits desired for the measurement of voltage drop at a specified current are converted to limits for ignitor current in circuit with a specified voltage and series resistance. By the use of the nine different values of series resistance 9, 10, 11, 12, 13, 14, 15, 16, 17, ignitor current limits for all TR tubes are set to three ranges. These ranges are 60 to 100 microamperes, 80 to 120 microamperes and 90 to 110 microamperes; each range may be set out in a different colored band on the scale of the microammeter 22 to facilitate rapid recognition. A portion of the total series resistance 25, 26, 27, is mounted physically close to each tube socket 28, 29, 30, respectively, to eliminate any relaxation oscillations of the ignitor circuit due to stray lead capacities.

Ignitor voltage

The ignitor voltage characteristic is measured by the circuit formed when the operate switch 24 is pulled down to close its number 1 and 2 terminals and open its number 3 and 4 terminals. This circuit goes from ground on the tube under test, including said tube under test and its associated ignitor series limiting resistor, the number 2 terminals of the operate switch 24, the number 1 terminals of the line set switch 19, the selected ignitor series limiting resistors of the range selector switch 18, the D.C. power supply bleeder 33, the microammeter 22 and its shunted condenser 23, and goes to ground near said microammeter. The condenser 23 bypasses any A.C. component of voltage that appears between the low side of the D.C. power supply and ground.

When the operate switch 24 is pulled down, the needle of the microammeter 22 deflects and comes to rest in the predetermined current range marked on the scale of said microammeter for the tube under test in accordance with the type of said tube and noted in the tube chart (shown in Fig. 2). The microammeter 22 deflection is an accurate indication of tube ignition voltage because the circuit has a known resistance and a known voltage supply across the tube under test.

The TR tube testing apparatus of the present invention is preferably housed in an essentially solid rectangular-shaped cabinet 60 having a sloping front 61, a back, two sides, a bottom, a top and a top cover. The front, back and top have holes through the back in predetermined positions. The holes in the back (not shown in the figures) are adapted to pass an A.C. power line and the control shaft of the timer set control potentiometer 38 (not shown in Fig. 2) through said back.

The holes through the lower portion 62 of the front are adapted to pass the control member of the A.C. line switch 1, the control shaft of the line set control potentiometer 8 and the control member of the line set switch 19 through the front, in predetermined positions, to permit manual control of said elements. A hole through the lower portion 62 of the front is adapted to permit full view presentation of the A.C. line indicator 4.

The sloping front 61 has a window therethrough adapted to permit full view presentation of face scale of the microammeter 22. A hole in the sloping front 61 is adapted to permit full view presentation of the timer indicator 40. Other holes through the sloping front 61 are adapted to pass the control shaft of the range selector switch 18 and the control member of the operate switch 24 through the front, in predetermined positions, to permit manual control of said elements.

The holes through the top 63 of the cabinet 60 are adapted to support the tube sockets 28, 29 and 30, of the tube mount 31, in said top. A hole through the top 63 is adapted to pass the ground line 32 (not shown in Fig. 2) through the top. A plurality of different sized adaptors 64 are removably supported by clips (not shown in the figures) affixed to the top 63.

The adaptors 64 are essentially bayonet type plugs of varying lengths and come in sizes 1 through 5, consecutively, dependent upon their lengths. They vary in length because the types of TR tubes inserted in the socket 29 vary in their clearances above the surface of said socket. Thus, a TR tube having large diameter end flanges utilizes a number 4 or number 5 adaptor for insertion into the socket 29, whereas a small diameter end-flanged tube utilizes a number 1 or number 2 adaptor.

The top cover 65 is adapted to cover the top 63 of the cabinet 60 when the apparatus is not in use. The inside of the top cover 65 has a list of operating instructions 66 and a tube chart 67 affixed to its inside surface.

The A.C. line switch 1 brings line voltage to the circuit of the present invention and the A.C. line indicator 4 indicates whether said circuit has line voltage applied to it. The line set switch 19 and the line set control 8 are utilized to set the D.C. high voltage. The range selector switch 18 is set at a specific position for each tube type tested; it selects the value of series limiting resistance in the ignitor circuit. The operate switch 24 is pulled down for testing each tube after the initial setting and observations have been made. The timer indicator 40 and the microammeter 22 are utilized for initial adjustment of the D.C. voltage and final measurement of ignitor firing time and ignitor current. Voltage readings are made by means of the microammeter 22 when the line set switch 19 is depressed, since said microammeter is placed across the output of the D.C. power supply in series with a suitable high resistance multiplier. The timer set control potentiometer 38 is utilized to adjust the timer circuit for a flash of the timer indicator 40 five seconds after the operate switch 24 is pulled down. Five seconds is the selected ignition time period limit, so that if a tube under test ignites before the timer indicator 40 flashes, as indicated by a reading of the microammeter 22, said tube is acceptable as far as its ignition time is concerned. Ignition voltage is determined directly from the reading of the microammeter 22. The adaptors 64 permit the insertion of all types of TR tubes in the tube socket 29.

A preferred tube chart 67 for the present invention is composed as follows.

| TR Tube Type | Range Selector Switch Position | Tube Socket Utilized | Adaptor Utilized | Microammeter Needle Position Band in Microamperes |
|---|---|---|---|---|
| 1B23 | 6 | 29 | 1 | 60 to 100 Red. |
| 1B24 | 2 | 30 | | 80 to 120 Yellow. |
| 1B24A | 2 | 30 | | Do. |
| 1B26 | 2 | 30 | | Do. |
| 1B27 | 1 | 29 | 2 | Do. |
| 1B40 | 9 | 28 | | 90 to 110 Green. |
| 1B50 | 3 | 30 | | 80 to 120 Yellow. |
| 1B55 | 4 | 29 | 1 | Do. |
| 1B58 | 3 | 29 | 1 | Do. |
| 1B60 | 2 | 30 | | Do. |
| 1B62 | 8 | 29 | 5 | 90 to 110 Green. |
| 1B63A | 9 | 29 | 1 | 60 to 100 Red. |
| 721A | 5 | 29 | 5 | Do. |
| 721B | 5 | 29 | 5 | Do. |
| 724A | 7 | 29 | 2 | Do. |
| 724B | 7 | 29 | 2 | Do. |
| 5790 | 7 | 30 | | 80 to 120 Yellow. |
| 5853 | 3 | 29 | 1 | Do. |
| 5863 | 8 | 29 | 4 | 60 to 100 Red. |
| 5865 | 9 | 29 | 4 | Do. |

The TR tube types are listed in accordance with the designations of the Radio and Television Manufacturers Association. The range selector switch position is the position of the rotary selector 21 of the range selector switch 18 for the TR tube listed. The 1B40 type TR tube is the only one which utilizes the tube socket 28 of the tube mount 31, since said tube socket is grounded to comply with the different configuration of said tube.

Each type of TR tube has its permissible ignitor voltage range set out for it as a scale range of the microammeter 22. Thus, when the needle of the microammeter 22 deflects in the range of 60 to 100 microamperes, the type 1B23, 1B63A, 721A, 721B, 724A, 724B, 5863 and 5865 TR tube have the proper ignitor voltage characteristic. When the needle of the microammeter 22 deflects in the range of 80 to 120 microamperes, the type 1B24, 1B24A, 1B26, 1B27, 1B50, 1B55, 1B58, 1B60, 5790 and 5853 TR tube have the proper ignitor voltage characteristic. When the needle of the microammeter 22 deflects in the range of 90 to 110 microamperes, the type 1B40 and 1B62 TR tube have the proper ignitor voltage characteristic.

For rapidity in recognition of the deflection range of the needle of the microammeter 22 for each test tube, the listed scale ranges may be differently colored. Thus, in a preferred embodiment of this invention, the 60 to 100 microamperes range has a red band scale background or strip, the 80 to 120 microamperes range has a yellow band scale background or strip, and the 90 to 110 microamperes range has a green band scale background or strip.

The A.C. line switch 1 closes the circuit to the A.C. input source 2 to provide power to the primary 45 of the constant voltage transformer 46 and to the primary 47 of the filament transformer 48. The secondary 49 of the filament transformer 48 provides filament power for the rectifier tube 50, which provides the D.C. power. The secondary 51 of the constant voltage transformer 46 provides power for the primary 52 of the power transformer 53. The pilot light 5, of the A.C. line indicator 4, derives its power from the coil 54 of the power transformer 53. One terminal of the secondary 55 of the power transformer 53 is connected to the loop of the secondary 49 of the filament transformer 48 and the filament of the rectifier tube 50; the other terminal of said secondary goes to the D.C. power supply filter 56.

The D.C. power supply filter is a "pi" type filter known in the art, and comprises the choke coil 57 in the output of the rectifier tube 50 and the condensers 58 and 59 shunted across the output of the D.C. power supply. In a preferred embodiment of this invention, the choke coil 57 has an inductance of 20 henries and the condensers 58 and 59 have capacitances of 12 microfarads.

The D.C. power supply circuit is of a type known in the art and its components are suitable ones selected from those known in the art. The D.C. power supply circuit, its components and the D.C. power supply filter 56, operate, in a manner known in the art, to produce desired voltage and current characteristics at the output terminals 6 and 7 of said D.C. power supply.

The operation, briefly summarized, includes first operating line set switch 19 to open its contacts 1 and close its contacts 2, which causes a current to pass through the ammeter 22, all of the resistance units of the selector switch 18 and the line set control 8. One operates the control 8 until the indicator arm of ammeter 22 is at about the center of the scale. The switch 19 is then released and it returns to its position closing its contacts 1 and opening its contacts 2. Then one sets the range selector arm 21 to that member of the units which is indicated on the chart for the tube to be tested. Next, the tube to be tested is placed in one of the sockets or mountings 28, 29 or 30, and a ground established to a terminal of the tube that is not the firing electrode. The proper resistance 25, 26 or 27 is connected to the firing electrode of the tube to be tested. If the needle then deflects into the short range area of the scale of the ammeter, the tube has a short and is bad and should be discarded. If the needle does not so deflect, then switch 24 is operated to close its contacts 1 and 2 and open its contacts 3 and 4. If neon tube flashes before the tube fires, the tube is bad and should be discarded. If the current measuring device indicates a current in a selected range the tube is considered satisfactory, otherwise it should be discarded.

Obviously many modifications and variations of the present invention are possible in the light of the above teachings. It is therefore to be understood that within

We claim:

1. TR tube testing apparatus comprising a D.C. power supply having two output terminals, an A.C. line switch in the input to said power supply, an A.C. indicator lamp in the output of said power supply, a line set control potentiometer in series connection with one of said output terminals, a range selector switch having a rotary selector and a plurality of ignitor series limiting resistors, said rotary selector being adapted to electrically contact the common terminals between said plurality of ignitor series limiting resistors, said plurality of ignitor series limiting resistors being in series connection with said line set control potentiometer, a line set switch having two sets of terminals and a spring returned push button connector, one of said two sets of line set switch terminals being normally open and the other of said sets being normally closed, said normally open set of line set switch terminals being in series connection with said plurality of ignitor series limiting resistors, a microammeter in series connection with the other of said D.C. power supply output terminals, said microammeter being grounded, a condenser shunted across said microammeter, a voltage multiplier resistor in series connection between the ground side of said microammeter and said normally open set of line set switch terminals, said normally closed set of line set switch terminals being in series connection with said rotary selector, an operate switch having four sets of terminals and a spring returned lever type double throw connector, two of said four sets of operate switch terminals being normally open and the other of said sets being normally closed, the second of said normally open sets of operate switch terminals being series connected to said normally closed set of line set switch terminals, a tube mount having a plurality of tube sockets adapted to receive TR tubes for testing, one of said tube sockets being grounded, a ground line adapted to ground TR tubes in said sockets, each of said tube sockets being connected through an ignitor series limiting resistor to a common terminal, said common terminal being series connected to said second of said normally open sets of operate switch terminals, a D.C. power supply bleeder having two series connected resistors, a timer circuit bleeder having two resistors and a timer set control potentiometer in series connection, said D.C. power supply bleeder and said timer circuit bleeder being shunted across said D.C. power supply output terminals between said line set control potentiometer and said plurality of ignitor series limiting resistors of one of said output terminals and between said microammeter and said other output terminal, a timer indicator having a neon lamp in parallel connection with a timer circuit charging condenser, said timer indicator being series connected between said other D.C. power supply terminal and the first of said normally open sets of operate switch terminals, a timer circuit charging resistor, said first of said normally open sets of operate switch terminals being series connected to said timer circuit charging resistor, said timer circuit charging resistor being in series connection with a terminal of said timer set control potentiometer, a discharge resistor in series connection with the second of said normally closed sets of operate switch terminals, said discharge resistor and said second of said normally closed sets of operate switch terminals being shunted across said timer indicator, said D.C. power supply bleeder being in series connection with the first of said normally closed sets of operate switch terminals from a point between said D.C. power supply bleeder resistors, said first of said normally closed sets of operate switch terminals being in series connection with said second of said normally open sets of operate switch terminals at a point between said second of said normally open sets of operate switch terminals and said tube mount.

2. TR tube testing apparatus comprising a D.C. power supply having two output terminals, a line set control potentiometer in series connection with one of said output terminals, a range selector switch having a rotary selector adapted to contact the common terminals between a plurality of ignitor series limiting resistors, a line set switch having two sets of terminals and a spring returned push button connector, one of said two sets of line set switch terminals being normally open and the other of said sets being normally closed, said plurality of ignitor series limiting resistors being series connected between said line set control potentiometer and said normally open set of line set switch terminals, a grounded microammeter in series connection with the other of said D.C. power supply output terminals, a condenser shunted across said microammeter, a voltage multiplier resistor in series connection between the ground side of said microammeter and said normally open set of line set switch terminals, said normally closed set of line set switch terminals being in series connection with said rotary selector, an operate switch having four sets of terminals and a spring returned lever type double throw connector, two of said four sets of operate switch terminals being normally open and the other of said sets being normally closed, the second of said normally open sets of operate switch terminals being series connected to said normally closed set of line set switch terminals, a plurality of TR tube sockets, means for grounding TR tubes in said sockets, each of said tube sockets being connected through a resistor to a common terminal, said common terminal being series connected to said second of said normally open sets of operate switch terminals, two series connected resistors, a timer set control potentiometer in series connection with two resistors, said two resistors and said timer set control potentiometer and two resistors being shunted across said D.C. power supply output terminals between said line set control potentiometer and said plurality of ignitor series limiting resistors of one of said output terminals and between said microammeter and said other output terminal, a timer indicator lamp in parallel connection with a timer circuit charging condenser, said timer indicator lamp being series connected between said other D.C. power supply terminal and the first of said normally open sets of operate switch terminals, a timer circuit charging resistor series connected between said first of said normally open sets of operate switch terminals and a terminal of said timer set control potentiometer, a discharge resistor in series connection with the second of said normally closed sets of operate switch terminals, said discharge resistor and said second of said normally closed sets of operate switch terminals being shunted across said timer indicator lamp, a point between said two resistors being series connected to the first of said normally closed sets of operate switch terminals, said first of said normally closed sets of operate switch terminals being series connected to the tube socket side of said second of said normally open sets of operate switch terminals.

3. TR tube testing apparatus comprising a D.C. power supply having two output terminals, a line set control potentiometer, a range selector switch having a rotary selector adapted to contact the common terminals between a plurality of resistors, a line set switch having two sets of terminals and a spring returned push button connector, one of said two sets of terminals being normally open and the other of said sets being normally closed, a grounded microammeter shunted by a condenser, a voltage multiplier resistor, a circuit loop between said D.C. power supply output terminals including said line set control potentiometer, said plurality of resistors, said normally open set of said two sets of terminals, said voltage multiplier and said microammeter, an operate switch having four sets of terminals and a spring returned lever type double throw connector, two of said four sets of terminals being normally open and the other of said sets being normally closed, means for supporting grounded TR tubes in a circuit loop including said tube supporting means, series resistors, the second of said normally open sets of said four terminals, said normally closed set of said two sets of terminals and said rotary selector, two series connected resistors, a timer set control potentiometer in series connection with two resistors, said two resistors and said timer set control potentiometer and resistors being shunted across said D.C. power supply output terminals between said line set control potentiometer and said plurality of resistors and between said microammeter and said D.C. power supply, a timer indicator lamp shunted by a condenser, a charging resistor, a circuit loop from a terminal of said timer set control potentiometer to one of said D.C. power supply output terminals including said timer indicator lamp, the first of said normally open sets of said four terminals and said charging resistor, a discharge resistor, a circuit loop shunted across said timer indicator lamp including said discharge resistor and the second of said normally closed sets of said four terminals, a circuit connection between a point between said two resistors and a point between said tube supporting means and said second of said normally open sets of said four terminals including the first of said normally closed sets of said four terminals.

4. TR tube testing apparatus comprising means for supporting grounded TR tubes to be tested, a grounded microammeter, a timer indicator lamp, an operate switch having four sets of terminals and a spring returned lever type double throw connector, two of said four sets of terminals being normally open and the other of said sets being normally closed, a line set switch having two sets of terminals and a spring returned push button connector, one of said two sets of terminals being normally open and the other of said sets being normally closed, means for producing a predetermined D.C. voltage across two output terminals, said D.C. voltage producing means including a D.C. power supply, means for regulating said predetermined D.C. voltage, said voltage regulating means including a line set control potentiometer and a range selector switch having a rotary selector adapted to electrically contact the common terminals of a plurality of series connected resistors, said voltage regulating means being operative through a circuit loop between said output terminals including said line set control potentiometer, said plurality of series connected resistors, the normally open set of said two sets of terminals, a voltmeter multiplier resistor and said microammeter, means for setting voltage drop limits for a TR tube to be tested, said voltage setting means being operative through a circuit loop including a predetermined number of said plurality of series connected resistors, said rotary selector and the normally closed set of said two sets of terminals, short circuit testing means for said tube, said short circuit testing means being operative through a circuit loop from ground to ground including said tube supporting means, the first of said normally closed sets of said four sets of terminals, resistors shunted across said output terminals and said microammeter, means for regulating said timer indicator lamp, said lamp regulating means including a timer set control potentiometer, means for charging said lamp and means for discharging said lamp, said lamp regulating means being operative through a lamp charging circuit loop between said output terminals and a lamp discharging circuit loop shunted across said lamp, said lamp charging circuit including said timer set control potentiometer, said lamp charging means and the first of said normally open sets of said four sets of terminals, said lamp discharging means including said lamp discharging means and the second of said normally closed sets of said four sets of terminals, said timer set potentiometer being shunted across said output terminals, means for testing the firing time and voltage characteristics of said tube, said firing time and voltage testing means being operative through a circuit loop from ground to ground including said tube supporting means, the second of said normally open sets of said four sets of terminals, the normally closed set of said two sets of terminals, said rotary selector, a predetermined number of said plurality of series connected resistors, said shunted resistors and said microammeter, A.C. voltage bypass means for said microammeter, said bypass means including a condenser shunted across said microammeter.

5. TR tube testing apparatus comprising means for supporting grounded TR tubes to be tested, a grounded microammeter, a timer indicator lamp, an operate switch having four sets of terminals and a spring returned lever type double throw connector, two of said four sets of terminals being normally open and the other of said sets being normally closed, a line set switch having two sets of terminals and a spring returned push button connector, one of said two sets of terminals being normally open and the other of said sets being normally closed, means for producing a predetermined D.C. voltage across two output terminals, a range selector switch having a rotary selector adapted to electrically contact the common terminals of a plurality of series connected resistors, means for regulating said predetermined D.C. voltage, said voltage regulating means being operative through a circuit loop between said output terminals including a line set control potentiometer, said plurality of series connected resistors, the normally open set of terminals of said line set switch, a resistor and said microammeter, means for setting voltage drop limits for a TR tube to be tested including said range selector switch, means for short circuit testing said tube, said short circuit testing means being operative through a circuit loop from ground to ground including said tube supporting means, the first of said normally closed sets of terminals of said operate switch, resistors shunted across said output terminals and said microammeter, means for charging and discharging said timer indicator lamp at selected time intervals, said lamp charging means being operative through a circuit loop between said output terminals including a timer set control potentiometer, a lamp charging resistor and condenser and the first of said normally open sets of terminals of said operate switch, said lamp discharging means being operative through a circuit loop shunted across said lamp including the second of said normally closed sets of terminals of said operate switch and a discharge resistor, said timer set potentiometer being shunted across said output terminals, means for testing the firing time and voltage characteristics of said tube, said firing time and voltage testing means being operative through a loop from ground to ground including said tube supporting means, the second of said normally open sets of terminals of said operate switch, the normally closed set of said two sets of terminals of said line set switch, said rotary selector, a predetermined number of said plurality of series connected resistors, said shunted resistors and said microammeter, A.C. voltage bypass means for said microammeter.

6. TR tube testing apparatus comprising means for supporting a TR tube to be tested, a microammeter, a timer indicator lamp, an operate switch having a spring returned lever type double throw connector, two sets of normally open terminals and two sets of normally closed terminals, means for producing a predetermined D.C. voltage across two output terminals, a range selector switch having a rotary selector adapted to electrically contact the common terminals of a plurality of series connected resistors, means for regulating said predetermined D.C. voltage, said voltage regulating means including said plurality of series connected resistors, a variable resistor and said microammeter in series connection between said output terminals, means for setting voltage drop limits for said tube including said range selector switch, means for testing said tube for short circuit, said short circuit testing means including said tube supporting means, a set of normally closed operate switch terminals, a resistor shunted across said output terminals and said microammeter in closed loop series connection across said output terminals, means for charging and discharging said timer indicator lamp at selected time intervals, said lamp charging means including a variable resistor, fixed resistors, a lamp charging condenser and a set of normally open operate switch terminals in closed loop series connection across said output terminals, said lamp discharging means including a resistor and a set of normally closed operate switch terminals in series connection shunted across said lamp, means for testing the firing time and voltage characteristics of said tube, said firing time and voltage testing means including said tube supporting means, a set of normally open operate switch terminals, said rotary selector, a predetermined number of said plurality of series connected resistors, said lamp charging variable resistor and said microammeter in closed loop series connection across said output terminals.

7. TR tube testing apparatus comprising means for supporting a TR tube to be tested, a microammeter, a lamp, a spring returned lever double throw type switch having normally closed sets of terminals and normally open sets of terminals, means for producing a D.C. voltage, means for varying the series resistance of a plurality of series connected resistors, means for regulating said D.C. voltage, said voltage regulating means including said plurality of series connected resistors and a variable resistor in series connection across said D.C. voltage, means for testing said tube for short circuit, said short circuit testing means including said tube supporting means, a normally closed set of said switch terminals, a shunt resistor and said microammeter in series connection across said D.C. voltage, means for charging and discharging said lamp at selected time intervals, said lamp charging means including a variable resistor, fixed resistors, a condenser and a normally open set of said switch terminals in series connection across said D.C. voltage, said lamp discharging means including a resistor and a normally closed set of said switch terminals shunted across said lamp, means for testing the firing time and voltage characteristics of said tube, said firing time and voltage testing means including said tube supporting means, a normally open set of said switch terminals, a predetermined number of said plurality of series connected resistors, said lamp circuit variable resistor and said microammeter in series connection across said D.C. voltage.

8. TR tube testing apparatus comprising means for supporting a TR tube to be tested, electric current measuring means, a lamp, a double throw lever type switch having four sets of terminals, means for producing a D.C. voltage, a potentiometer type variable resistor, means for regulating said D.C. voltage, said voltage regulating means including said potentiometer type variable resistor and a variable resistor in series connection across said D.C. voltage, means for testing said tube for short circuit, said short circuit testing means including said tube supporting means, a set of said switch terminals, a shunt resistor and said measuring means in series connection across said D.C. voltage, means for charging and discharging said lamp at selected time intervals, said lamp charging means including a variable resistor, fixed resistors, a condenser and a set of said switch terminals in series connection across said D.C. voltage, said lamp discharging means including a resistor and a set of said switch terminals shunted across said lamp, means for testing the firing time and voltage characteristics of said tube, said firing time and voltage testing means including said tube supporting means, a set of said switch terminals, a predetermined resistance of said potentiometer type variable resistor, said lamp circuit variable resistor and said measuring means in series connection across said D.C. voltage.

9. TR tube testing apparatus comprising means for supporting a TR tube to be tested, electric current measuring means, a lamp, means for producing a D.C. voltage, means for regulating said D.C. voltage, said voltage regulating means including the entire resistance of a first variable resistor in series with a second variable resistor across said D.C. voltage, means for short circuit testing said tube, said short circuit testing means including said tube supporting means, a shunt resistor and said measuring means in series across said D.C. voltage, means for charging and discharging said lamp at selected time intervals, said lamp charging means including a third variable resistor, fixed resistors and a condenser in series across said D.C. voltage, said lamp discharging means including a resistor shunted across said lamp, means for testing the firing time and voltage characteristics of said tube, said firing time and voltage testing means including said tube supporting means, a predetermined resistance of said first variable resistor, said third variable resistor and said measuring means in series across said D.C. voltage, switching means adapted for activating said means for charging said lamp and for firing time and voltage testing and for deactivating said means for short circuit testing and for discharging said lamp, said switching means being adapted for activating said means for short circuit testing and for discharging said lamp and for deactivating said means for charging said lamp and for firing time and voltage testing.

10. TR tube testing apparatus comprising means for supporting a TR tube to be tested, electric current measuring means, a lamp, a source of D.C. voltage, means for regulating said D.C. voltage including variable resistance in series across said D.C. voltage, means for short circuit testing said tube including said tube supporting means, shunt resistance and said measuring means in series across said D.C. voltage, means for charging and discharging said lamp at selected time intervals, said lamp charging means including variable resistance, resistance and capacitance in series across said D.C. voltage, said lamp discharging means including a resistance shunted across said lamp, means for testing the firing time and firing voltage of said tube including said tube supporting means, a selected portion of said voltage regulating means variable resistance, said lamp charging means variable resistance and said measuring means in series across said D.C. voltage, switching means for activating and deactivating each of said testing means.

11. TR tube testing apparatus comprising means for supporting a TR tube to be tested, current measuring means, a source of D.C. voltage, means for regulating said D.C. voltage including variable resistance in series across said D.C. voltage, means for short circuit testing said tube including said tube supporting means and said measuring means in series with a shunt resistance across said D.C. voltage, time indicating means, time indicating control means including a neon lamp for indicating elapsed predetermined periods of time, means for testing the firing time and firing voltage of said tube including said tube supporting means and said measuring means in series with a variable resistance across said D.C. voltage, and switching means for activating and deactivating each of said testing means.

12. TR tube testing apparatus comprising means for supporting a tube to be tested, current indicating means, time indicating means adapted to indicate elapsed predetermined periods of time, a source of D.C. voltage, variable resistance means for regulating said D.C. voltage, means for short circuit testing said tube including said tube supporting means and said current indicating means in series across said D.C. voltage, means employing a neon lamp for testing the ignition time and ignition voltage of said tube including said tube supporting means and said current indicating means in series with variable resistance across said D.C. voltage, switching means for activating and deactivating selected ones of said testing means.

13. TR tube testing apparatus comprising means for supporting a tube to be tested in circuit with current indicating means, time indicating means, means for supplying a regulated D.C. voltage, means for short circuit testing said tube including said tube and said current indicating means in circuit across said D.C. voltage, means including a neonlamp shunted by a capacitor and a discharge resistor for testing the ignition time and ignition voltage of said tube including said tube and said current indicating means in series with selected resistance across said D.C. voltage, means for activating and inactivating selected ones of said testing means.

14. TR tube testing apparatus, comprising a support in which a tube to be tested may be temporarily supported, a source of direct current, a current measuring device, a time circuit bleeder resistance connected across said source of current and formed of two resistances and a potentiometer in series, with the potentiometer between the resistances, a neon tube, a condenser connected in shunt across said neon tube, a switch having two normally open contacts and one normally closed contact, a timing circuit including in series therein the tap of said potentiometer, said one normally open contact of said switch, said neon tube and one side of said source of current, a condenser discharge circuit connected in shunt across said neon tube and having in series therein one normally closed contact of said switch and a discharge resistor, said switch contacts being ganged for operation together, in one direction to close the normally open switch contacts and open the normally closed switch contacts, and in the other direction to restore the contacts to said normal positions, a range selector having a plurality of resistance units connected in series and a selector arm movable across said units to contact electrically in succession with the connections between said units, and a firing circuit including in series therein one side of said source of current, one end of said series connected units, one or more of said units as determined by the position of said selector arm, the other of said normally open switch contacts, said tube to be tested, said current measuring means and the other side of said source of current.

15. The apparatus as set forth in claim 14, and a circuit charging resistor in series in said timing circuit.

16. The apparatus as set forth in claim 14, and a connection from the opposite end of said series connected units to said current measuring means at the side which is connected to said tube to be tested, and a double manually controlled switch having one part in series with said firing circuit and normally connecting said selector arm to said other of said normally open switch contacts and another part, normally open in series in said connection between said opposite end of said series connected units and said current measuring means, said last named switch being operable to close the circuit at said another part when the circuit of said one part is opened, and vice versa.

17. The apparatus as set forth in claim 16, and a selectively variable resistance in series between the side of said source of current which is connected to said range selector.

18. The apparatus as set forth in claim 14, wherein said first mentioned switch has another normally closed contact, a power supply resistance bleeder connected in shunt across said source of power, and a short testing circuit including in series an intermediate point of said supply bleeder resistance, said another normally closed contact of said first mentioned switch, said tube to be tested, said current measuring means and said other side of said source of current.

References Cited in the file of this patent

UNITED STATES PATENTS

| | | |
|---|---|---|
| 1,897,450 | Van Beusekom | Feb. 14, 1933 |
| 2,007,992 | Wenger | July 16, 1935 |
| 2,033,347 | Manly | Mar. 10, 1936 |
| 2,440,287 | Oravetz | Apr. 27, 1948 |
| 2,485,924 | Sanders | Oct. 25, 1949 |
| 2,630,476 | Zelov | Mar. 3, 1953 |
| 2,715,711 | Wells et al. | Aug. 16, 1955 |
| 2,723,368 | Curtis et al. | Nov. 8, 1955 |
| 2,761,104 | Morris | Aug. 28, 1956 |

FOREIGN PATENTS

| | | |
|---|---|---|
| P11,080 | Germany | Jan. 5, 1956 |

OTHER REFERENCES

Article: VR Tube Tester, Radio Electronics, November 1954, pages 51–52.